United States Patent
San

(10) Patent No.: US 6,900,794 B1
(45) Date of Patent: May 31, 2005

(54) KEYBOARD LAYOUT

(76) Inventor: Ho Mun San, Apartment D, 12/F Duke Garden, No. 2, Duke Street, Prince Edward Road West, Kowloon (HK)

( * ) Notice: Subject to any disclaimer, the term of this patent is extended or adjusted under 35 U.S.C. 154(b) by 550 days.

(21) Appl. No.: 09/432,750

(22) Filed: Nov. 3, 1999

(30) Foreign Application Priority Data

Nov. 23, 1998 (GB) .............................................. 9825641

(51) Int. Cl.$^7$ ................................................ G09G 5/00
(52) U.S. Cl. .......................... 345/168; 341/22; 400/486
(58) Field of Search ................................. 345/168, 169, 345/172; 341/21, 22, 23; 400/486, 489, 485

(56) References Cited

U.S. PATENT DOCUMENTS

| | | | |
|---|---|---|---|
| 4,180,337 A | * | 12/1979 | Otey, III et al. |
| 4,358,278 A | * | 11/1982 | Goldfarb |
| 4,615,629 A | * | 10/1986 | Power |
| 4,963,044 A | * | 10/1990 | Warnet |
| 5,557,299 A | * | 9/1996 | Maynard et al. |

FOREIGN PATENT DOCUMENTS

| | | | |
|---|---|---|---|
| CA | 2093993 | * | 10/1994 |
| EP | 0533055 | * | 3/1993 |
| GB | 2110163 | * | 6/1983 |

\* cited by examiner

Primary Examiner—Regina Liang
(74) Attorney, Agent, or Firm—Duane Morris LLP

(57) ABSTRACT

A keyboard for inputting alphanumeric characters, for example the keyboard of a personal computer, is disclosed in which the alphabetic characters are disposed in alphabetic sequence to facilitate their location.

4 Claims, 1 Drawing Sheet

KEYBOARD LAYOUT

BACKGROUND OF THE INVENTION

This invention relates to the layout of a keyboard, and in particular the layout of a keyboard of a computer or a typewriter.

A conventional computer keyboard or a typewriter keyboard has a number of keys allowing the input of data and for controlling the operations of the personal computer. These keys include both alphanumeric character input keys as are found on a conventional typewriter, and also keys that are specific to operating the functions of a personal computer, eg CTRL & ALT keys, function keys F1–F12 and so on.

On a conventional personal computer keyboard the alphanumeric character input keys are arranged in the traditional QWERTY manner. That is to say the keys are arranged in four rows. A first top row contains the numeric keys 1,2,3, 4,5,6,7,8,9,0, while three lower rows contain the alphabetic characters. The first row has the letters Q,W,E,R,T,Y,U,I,O, P, the second row has the letters A,S,D,F,G,H,J,K,L and the third row has the letters Z,X,C,V,B,N,M.

The origin of the QWERTY layout lies in the nature of traditional manual typewriters in which individual letters were formed at the ends of arms which moved when a key was struck so as to strike the paper through an inked ribbon. One problem with the original typewriter in the 19$^{th}$ century was that jamming was sometimes caused when the keys of frequently used letters were struck. A way of solving this problem was to separate out from each other the most commonly used letters so that they were not close to each other on the keyboard. This resulted in the QWERTY layout that has remained commonplace to this day even though the original problem that it was designed to address no longer applies in these days of electronic keyboards.

Traditionally typing was always done by trained typists and secretaries who were trained in the QWERTY layout and who had no difficulty in using it. More recently, however, as personal computers become more commonplace in both the home and workplace a wider range of people are using keyboards either for typing letters and documents, or simply for inputting data into a computer system, or for entering data when searching the world wide web. Many of these people are not trained in the QWERTY layout and to them the layout of keys appears to be random and haphazard. This problem is even worse for people whose own language is not based on the Roman alphabet, for example Chinese, Japanese or Arabic individuals, or people who have received only a minimum education. For these people the conventional QWERTY layout is inconvenient and causes a number of problems that delays their use of a computer.

It is an object of the present invention therefore to overcome or at least mitigate these problems.

SUMMARY OF THE INVENTION

The present invention is a keyboard for inputting alphanumeric characters in which the keys corresponding to the letters of the alphabet are arranged in alphabetic sequence. The keys corresponding to the letters of the alphabet are disposed in a first row containing the letters A,B,C,D,E,F, G,H,I,J, a second row containing the letters K,L,M,N,O,P, Q,R,S, and a third row containing the letters T,U,V,W,X,Y,Z. The keyboard further comprises computer function keys and a spacer bar. The first row of alphabetic characters is disposed furthest away from the spacer bar, and means are provided for switching between the letters being disposed in an alphabetic sequence and a conventional QWERTY arrangement.

The advantage of this arrangement is that even for people whose language is not based on the Roman alphabet, they tend to know the sequence of letters in the alphabet and so can find the key that they are looking for with greater rapidity than on a QWERTY layout. This facilitates there use of the keyboard and makes it easier for them to use.

For maximum compatibility with existing keyboard production facilities, the letters may occupy the same area of the keyboard with merely their sequence within that area being changed. That is to say the letters of the alphabet may be disposed in three rows, a first row of 10 characters, a second row of 9 characters, and a third row of 7 characters. The alphabetic sequence may go from top to bottom or vice versa, and in the individual rows the sequence may go from left to right or vice versa.

In a most preferred embodiment the first row contains the letters A,B,C,D,E,F,G,H,I,J, the second row contains the letters K,L,M,N,O,P,Q,R,S and the third row contains the letters T,U,V,W,X,Y,Z. In each row the letters may go from left to right or right to left, and the letters may go in the same direction in all three rows or they may chance direction. For example the first row may go from left to right, the second—middle—row from right to left, and the third row from left to right again. This would have the advantage of presenting the letters in a continuous line.

The allocation of keys to letters may be accomplished in the hardware of the keyboard by appropriately changing the connections of the keys of the keyboard to the processor. More usefully however, this change in the allocation of the keys could be implemented in a software manner. This is preferable because it would allow the keyboard to be easily switched between a conventional QWERTY layout for those who are used to and trained in this layout, and an alphabetic sequence for those who find this easier.

An embodiment of the invention will now be described by way of example and with reference to the accompanying drawings, in which the single FIGURE illustrates the layout of alphabetic characters on a keyboard in accordance with the present invention.

DETAILED DESCRIPTION OF THE INVENTION

Figure 1:
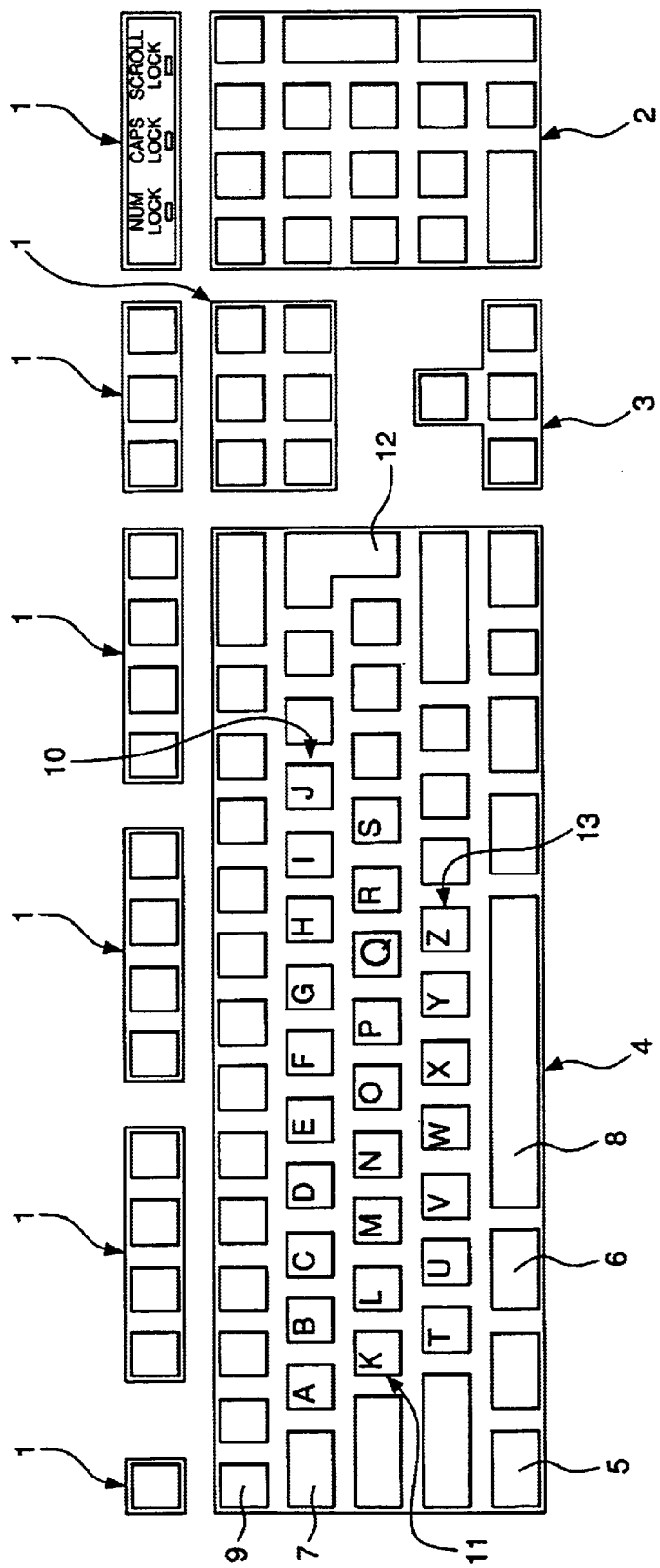
FIG. 1 is a top plan view of an alphanumeric keyboard according to one embodiment of the invention.

Referring to the FIGURE there is shown a computer input keyboard. The number of keys on this keyboard is conventional. In addition to the alphanumeric keys which will be described below, the keyboard also includes a number of function keys 1, a numeric keypad 2 with arithmetical function keys, and cursor shift keys 3. The main section 4 of the keyboard includes the alphanumeric keys and also further function keys such as CTRL 5, ALT 6, tab 7 and spacebar 8. The alphanumeric keys are located in a central block comprising four horizontal rows. For the purposes of definition the "top" row is the row furthest from the spacer bar, while the "bottom" row is the row closest to the spacer bar.

The numeric characters 1,2,3,4,5,6,7,8,9,0 are disposed in sequence in the top row 9. Additional keys in that row may be allocated to punctuation signs, arithmetical functions and so on. As such the key board is conventional. The second row 10, ie the row immediately below the first row, includes the letters A,B,C,D,E,F,G,H,I,J in their alphabetic sequence from left to right and taking the place of the letters Q,W,E,R,T,Y,U,I,O,P in a conventional arrangement. To the left of letter A is provided a tab key 7, while to the right of letter J may be provided keys for parenthetical symbols.

The next row 11 contains the letters K,L,M,N,O,P,Q,R,S in their alphabetical sequence from left to right and replacing the letters A,S,D,F,G,H,J,K,L on a conventional keyboard. To the left of the letter K may be a Caps Lock key, while to the right may be further punctuation keys and straddling both rows 10 and 11 may be an Enter key 12. Below row 11 is a third row 13 containing the letters T,U,V,W,X,Y,Z in their alphabetic sequence from left to right and replacing the letters Z,X,C,V,B,N,M from a conventional keyboard.

By providing the alphabetic keys in their alphabetic sequence it is far easier for a non-specialist keyboard operator to find the keys that he or she is seeking and this speeds up his or her operation of the keyboard. This is particularly so for someone whose mother tongue is not an alphabetically based language.

It will be appreciated that while in this embodiment the alphabetic sequence goes from the top row to the bottom, it could equally go the other way. Similarly the letters in each row could go from right to left and it may be preferably for the right-left sequence of the second, ie middle, row to be different from the two others such that the letters A–Z are presented in a continuous sequence.

The invention may be implemented by appropriately rearranging the wiring the keyboard such that no change had to be made to the computer processor. This would allow a computer processor to work with either a conventional QWERTY keyboard or a keyboard in accordance with the invention. Alternatively the keyboard may be wired as in a conventional QWERTY arrangement and the change in allocation of letters to keys may be made in software in the computer processor. That is to say the processor may be provided with software such that when running if conventional key Q is pressed the computer translates it to an A, and so on, (W translates to B, E translates to C . . . ). This would allow the same keyboard to be operated in a conventional QWERTY layout or in accordance with the present invention simply by selecting a program to be run. The alphabetic keys could be marked with both sets of letters, possibly in different colours to identify them.

It will be understood that the present invention may be applicable to the keyboard of a personal computer, an electronic typewriter or word processor, or any other device that requires the inputting of alphabetic characters.

What is claimed is:

1. A computer input keyboard for inputting alphanumeric characters in which the keys corresponding to the letters of the alphabet are arranged in alphabetic sequence, wherein the keys corresponding to the letters of the alphabet are disposed in a first row of containing the letters A,B,C,D,E,F,G,H,I,J, a second row containing the letters K,L,M,N,O,P,Q,R,S, and a third row containing the letters T,U,V,W,X,Y,Z, the keyboard further comprising computer function keys and a spacer bar wherein the first row of alphabetic characters is disposed furthest away from the spacer bar, and wherein means are provided for switching between the letters being disposed in an alphabetic sequence and a conventional QWERTY arrangement, wherein in each row the letters are in alphabetic sequence reading from right to left.

2. The keyboard as claimed in claim 1 wherein said switching means comprises a software application program in a computer processor.

3. A computer input keyboard for inputting alphanumeric characters in which the keys corresponding to the letters of the alphabet are arranged in alphabetic sequence, wherein the keys corresponding to the letters of the alphabet are disposed in a first row of containing the letters A,B,C,D,E,F,G,H,I,J, a second row containing the letters K,L,M,N,O,P,Q,R,S, and a third row containing the letters T,U,V,W,X,Y,Z, the keyboard further comprising computer function keys and a spacer bar wherein the first row of alphabetic characters is disposed furthest away from the spacer bar, and wherein means are provided for switching between the letters being disposed in an alphabetic sequence and a conventional QWERTY arrangement, wherein the letters in the middle of the three rows each read in sequence in the opposite direction from the other two rows.

4. The keyboard as claimed in claim 3, wherein said switching means comprises a software application program in a computer processor.

* * * * *